United States Patent [19]
Hattori

[11] Patent Number: 6,111,222
[45] Date of Patent: Aug. 29, 2000

[54] SOLDERING APPARATUS WITH SAFETY DEVICE

[75] Inventor: Masahiro Hattori, Yokohama, Japan

[73] Assignee: Japan Unix Co., Ltd., Tokyo, Japan

[21] Appl. No.: 09/327,503

[22] Filed: Jun. 8, 1999

[30] Foreign Application Priority Data

Jun. 23, 1998 [JP] Japan .................................. 10-176225
Apr. 15, 1999 [JP] Japan .................................. 11-108037

[51] Int. Cl.$^7$ ...................................................... B23K 3/00
[52] U.S. Cl. ............................ 219/240; 228/51; 219/506
[58] Field of Search .................................... 219/240, 241, 219/250, 251, 257, 506; 228/51; 340/635

[56] References Cited

U.S. PATENT DOCUMENTS

| | | | |
|---|---|---|---|
| 4,418,268 | 11/1983 | Munshaw | 219/242 |
| 4,546,235 | 10/1985 | Kolter | 219/230 |
| 4,822,979 | 4/1989 | deKam | 219/241 |
| 5,595,672 | 1/1997 | Sham et al. | 219/257 |
| 5,747,778 | 5/1998 | Liu | 219/506 |
| 5,844,204 | 12/1998 | Cubizolles et al. | 219/257 |

FOREIGN PATENT DOCUMENTS

| | | |
|---|---|---|
| 57-19153 | 2/1982 | Japan . |
| 8-112670 | 5/1996 | Japan . |
| 8203520 | 10/1982 | WIPO . |

OTHER PUBLICATIONS

Baker, John, "Soldering Iron Reminder", Radio and Electronics Constructor, vol. 34, No. 8, Apr. 1981.

*Primary Examiner*—John A. Jeffery
*Attorney, Agent, or Firm*—Oblon, Spivak, McClelland, Maier & Neustadt, P.C.

[57] ABSTRACT

A soldering apparatus with a safety device which operates automatically when a soldering iron is left in its on condition for a given period of time. A vibration sensor is attached to the soldering iron to sense vibrations of the soldering iron during soldering work. A heater control circuit is provided to be switched to a low-temperature mode when a period of time for which the vibration sensor does not sense the vibrations of the soldering iron continuously exceeding a set value, thereby maintaining the soldering iron at a predetermined low temperature in this situation.

18 Claims, 4 Drawing Sheets

SOLDERING APPARATUS WITH SAFETY DEVICE

BACKGROUND OF THE INVENTION

1. Field of the Invention

The present invention relates to a soldering apparatus with a safety device which is made such that the safety device automatically operates when soldering is not done for a long time in a state in which a soldering iron is in an on condition.

2. Description of the Related Art

A soldering iron to be used for soldering of electronic parts is made such that its tip portion is heated, and the tip portion temperature reaches 300 to 800° C. at the soldering. Accordingly, sufficient safety management is essential. In a conventional soldering apparatus, in the case that the soldering work is interrupted temporarily, a dedicated stand with a heat resistance is put to use for supporting a soldering iron. However, even during the work interruption, the temperature of the tip portion of the soldering iron is maintained at a high soldering temperature, and leaving the soldering iron in this state as it is for a long time is very dangerous, besides the deterioration of the iron tip portion easily occurs due to the oxidation, and even wasteful consumption of the electric power is extremely uneconomical.

Meanwhile, in general, soldering irons are additionally provided with a temperature control feature in which a temperature sensor senses the iron tip portion temperature while a control circuit turns on/off a heater so that the iron tip portion temperature comes to a set temperature. This temperature control feature is for retaining the iron tip portion temperature to a constant value, but not functioning a s a safety device. Accordingly, the use of these temperature control features cannot eliminate the aforesaid problems about safety and power consumption.

SUMMARY OF THE INVENTION

Accordingly, it is a principal technical object of the present invention to provide a soldering apparatus with a safety device which is capable of, when a soldering iron is left in the on condition for a given period of time, making the safety device automatically operate to improve the safety and to eliminate the wasteful power consumption.

Another technical object of this invention is to provide a soldering apparatus with a safety device permitting the resumption of the soldering work after the elapse of a short period of time in the case of a short soldering work discontinuation, thus enhancing the working efficiency.

For achieving these purposes, in accordance with this invention, there is provided a soldering apparatus in which a vibration sensor is attached to a soldering iron to sense vibrations at the use of the soldering iron, and while the vibrations of the soldering iron occur and the vibration sensor senses the vibrations thereof, a heater control circuit is maintained in a high-temperature mode to maintain a temperature of a tip portion of the soldering iron at a high temperature meeting a soldering requirement, whereas, if a period of time for which the vibration sensor does not sense the vibrations of the soldering iron continuously (vibration no-detection time) exceeds (becomes longer than) a first set time, the heater control circuit is switched to a low-temperature mode to lower the iron tip portion temperature and if the aforesaid vibration no-detection time further exceeds a second set time, the heater control circuit is switched to a power-off mode to turn off a heater.

Thus, when the soldering iron is left on for a given period of time because of the interruption of the soldering operation, the safety device operate automatically to switch the heater to the low-temperature mode, thereby surely providing high safety and preventing wasteful power consumption. Add to it that, since the vibration sensor is attached directly to the soldering iron to directly detect the vibrations of the soldering iron, it is possible to certainly detect the use/no-use irrespective of the location of the soldering iron, thus providing extremely high safety.

Furthermore, when the period of time for which the soldering work is interrupted is short, the soldering work can be resumed from the condition that the iron tip portion is kept at a low temperature, with the result that the temperature rises quickly and the resumption of the soldering work becomes efficiently feasible without delay.

According to a concrete embodiment of this invention, the heater control circuit is provided with a mode cancellation switch, and when the heater control circuit is in the low-temperature mode, if the mode cancellation switch is pressed or the vibration sensor senses the vibrations of the soldering iron, this low-temperature mode is canceled, while, when it is in the power-off mode, the cancellation of the power-off mode is possible only in a manner of the depression of the mode cancellation switch.

According to a preferred embodiment of this invention, added to a power supply circuit of a controller is a switch means for releasing the power supply circuit from its operation when the heater is switched to the power-off mode.

With the addition of this switch means the power consumption comes to zero in the power-off mode, thus promoting safety because of completely eliminating the danger stemming from the continuation of the energization condition, concurrently with improving the economy.

In addition, it is preferable that an alarm signal is issued when the heater control circuit turns to the low-temperature mode.

According to another concrete embodiment of this invention, the aforesaid vibration sensor is made up of a pair of contacts in connection with a vibration detection circuit and a vibration member disposed movably between these contacts to be freely movable so that it moves by the vibrations generated by the use of the soldering iron to bring both the contacts into the make and break (open and closed) conditions.

According to another preferred embodiment of this invention, the aforesaid soldering apparatus is equipped with a second alarm means which issues an alarm signal if the vibration sensor detects the vibrations of the soldering iron in a state where the soldering iron tip portion temperature does not satisfy the soldering requirements.

Thus, the operator can get the information indicative of troubles through the alarm signal in case the iron tip portion temperature does not meet the working conditions because of disconnection of the sensor or fault of the heater or in case the iron tip portion temperature does not sufficiently rise yet at the resumption of the work from the low-temperature mode after the work interruption. Accordingly, at this time the operator can discontinue the work immediately for avoiding the soldering deterioration.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
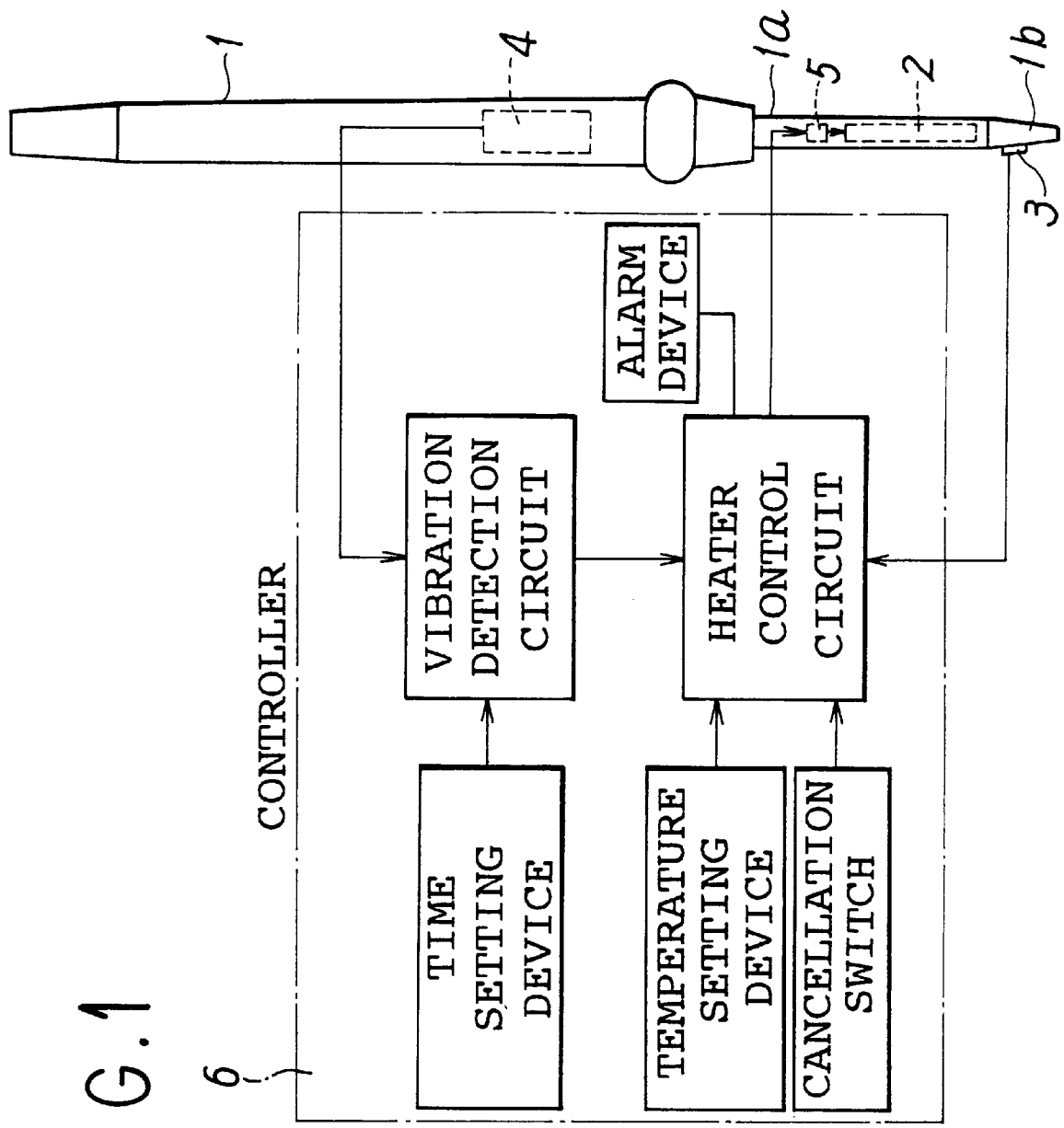
FIG. 1 is an illustration of a configuration of a soldering apparatus according to a first embodiment of this invention.

FIG. 1 shows a soldering apparatus with a safety device according to a first embodiment of the present invention. In FIG. 1, a soldering iron, designated at numeral 1, is of a contact type made such that its iron tip portion 1b is heated by an electric heater 2 built therein and melts a solder for soldering. Further, a temperature sensor 3 is attached to the iron tip portion 1b to sense the temperature of the iron tip portion 1b, and a vibration sensor 4 is also fitted to the soldering iron 1 to sense the vibrations occurring from the use of the soldering iron 1. The heater 2, the temperature sensor 3 and the vibration sensor 4 are in connection with a controller 6 which takes charge of the temperature control of the soldering iron 1.

The heater 2 is connected through a temperature fuse 5, fitted to an iron tip constituting member 1a, to the controller 6 so that, even if the heater 2 remains in the on condition because of a failure of the controller 6 or the like, the aforesaid temperature fuse 5 is molten to relieve a heater circuit.

The aforesaid controller 6 includes a heater control circuit for controlling the energization to the heater 2 to maintain the iron tip portion temperature at a set temperature and a vibration detection circuit for receiving a vibration detection signal from the vibration sensor 4 to switch the heater control circuit to a plurality of control modes.

The heater control circuit is switchable to three control modes: a high-temperature mode for maintaining the iron tip portion temperature at a first set temperature (for example, 300 to 800° C.) being a high value and satisfying a soldering requirement; a low-temperature mode for maintaining it at a second set temperature (for example, 150 to 250° C.) which is a value lower than the first set temperature; and a power-off mode for establishing a power-off condition. The temperature setting to this heater control circuit is done with a temperature setting device, and the heater control circuit makes the comparison between the set temperature and the iron tip portion temperature, which the temperature sensor 3 has actually detected, to perform the on/off control of the heater 2 so that the difference therebetween reaches zero, thereby adjusting the temperature to be generated for retaining the iron tip portion temperature at the set temperature.

On the other hand, the aforesaid vibration detection circuit is designed such that the reference time to be taken at the switching among the control moves in the heater control circuit is set to two long and short times through the use of a time setting device. Further, while the time of the soldering work interruption, that is, the time (vibration no-detection time) that the vibration sensor 4 does not sense the vibrations of the soldering iron 1 continuously, does not exceed a first set time being the short time, the heater control circuit is maintained at the high-temperature mode, and when exceeding the first set time, the heater control circuit is switched to the low-temperature mode, and further, if exceeding a second set time being the long time in this state, the heater control circuit is switched to the power-off mode.

In this instance, it is preferable that a first alarm device is connected to the aforesaid heater control circuit so that an alarm signal is issued from the first alarm device when the heater control circuit is switched to the low-temperature mode and/or the power-off mode. This alarm signal can be a voice, light, vibration or other alarm.

A mode cancellation switch is provided in the heater control circuit, and when being pressed at the resumption of the soldering operation, the low-temperature mode or the power-off mode is canceled and the heater control circuit is switched to the high-temperature mode.

Besides, it is preferable that, when the heater control circuit is set at the low-temperature mode, without pressing the mode cancellation switch the low-temperature mode is canceled in a manner that the vibration sensor 4 detects the vibrations of the soldering iron 1, whereas, when being in the power-off mode, the power-off mode is not canceled even if the vibration sensor 4 detects the vibrations of the soldering iron 1.

Figure 2:
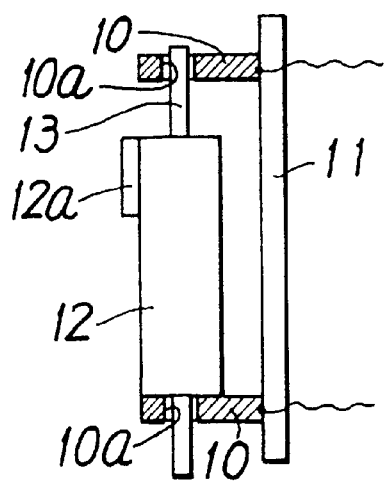
FIG. 2 is a cross-sectional view showing an example of a structure of a vibration sensor.

As FIG. 2 shows, the vibration sensor 4 is composed of a pair of contacts 10, 10 coupled to a vibration detection circuit, a base plate 11 made from an electrical insulation member for supporting these contacts 10, 10 in a state where they are spaced from each other, and a vibration member 12 disposed movably between these contacts 10, 10 in a state where both end portions of an electrically conductive contact 13 are loosely fitted in holes 10a of both the contacts 10, 10. Fitted to the vibration member 12 is a weight 12a which shifts the center of gravity of the vibration member 12 eccentrically to make the movement of the vibration member 12 unstable. Further, at the soldering operation, the vibration member 12 freely moves between both the contacts 10, 10 in accordance with the movements of the soldering iron 1 and the contact 13 comes into contact with both the contacts 10, 10 and separates therefrom so that the vibration sensor 4 repeatedly takes the on and off conditions.

In the soldering apparatus thus constructed, through the energization of the heater 2, the iron tip portion temperature is increased to the first set temperature set with the temperature setting device, before starting the soldering work. Further, if the soldering iron 1 is moved for the soldering work, the vibration sensor 4 repeatedly falls into the on and off conditions to thereby detect the vibrations of the soldering iron 1, with the result that the heater control circuit is maintained in the high-temperature mode and the iron tip portion temperature is maintained at the first set temperature being a high temperature meeting the soldering requirement.

Now, let it be assumed that the soldering iron 1 is left in the state of being supported by a stand or the like because of an interruption of the soldering work. In this case, since the vibration sensor 4 stays in the on or off condition and does not switch to the other condition, the state of no detection of vibrations continues. Further, if this vibration no-detection time exceeds the first set time, the vibration detection circuit switches the heater control circuit to the low-temperature mode so that the iron tip portion temperature goes lower to the second set temperature. At this time, the alarm device issues an alarm concurrently with or immediately before the switching to the low-temperature mode.

When the soldering work is resumed in the low-temperature mode, the vibration sensor 4 switches between the on and off conditions, and the heater control circuit is returned to the high-temperature mode. Similarly, even if the mode cancellation switch is pressed, the heater control circuit can be returned to the high-temperature mode. Accordingly, the work resumption is possible from the state that the iron tip portion 1b is maintained at the low temperature, and the temperature rises quickly to allow the resumption of the soldering after a short time, thus improving the work efficiency.

On the other hand, if the soldering iron 1 is left continuously after the heater control circuit is switched to the low-temperature mode and the vibration no-detection time detected by the vibration sensor 4 exceeds the second set time, the vibration detection circuit switches the heater control circuit to the power-off mode so that the heater turns off. Further, after being switched to the power-off mode in this way, this power-off mode is not canceled even if the vibration sensor 4 has detected the vibrations of the soldering iron 1, but the cancellation thereof is possible only by pressing the mode cancellation switch.

It is preferable that, after the heater control circuit gets into the power-off mode in this way, the aforesaid first alarm device issues an alarm sound at a given period (1 to 10 minutes).

Besides, it is also possible that a power-down switch is provided in the heater control circuit so that this power-down switch is pressed at the interruption of the soldering work to cause the soldering iron 1 to be switched immediately to the low-temperature mode.

In addition, it is also possible that the set temperatures, the set times and others in the controller 6 can be changed only after an input of a predetermined specific cipher number.

Figure 3:
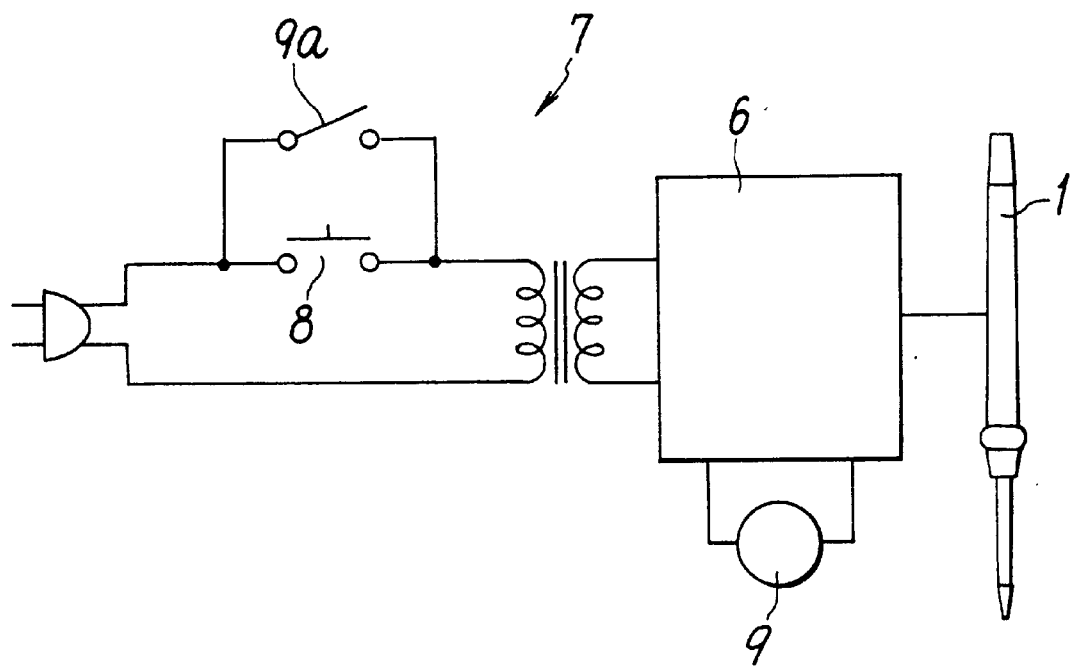
FIG. 3 is a schematic illustration of a configuration of a soldering apparatus according to a second embodiment of this invention.
Figure 4:
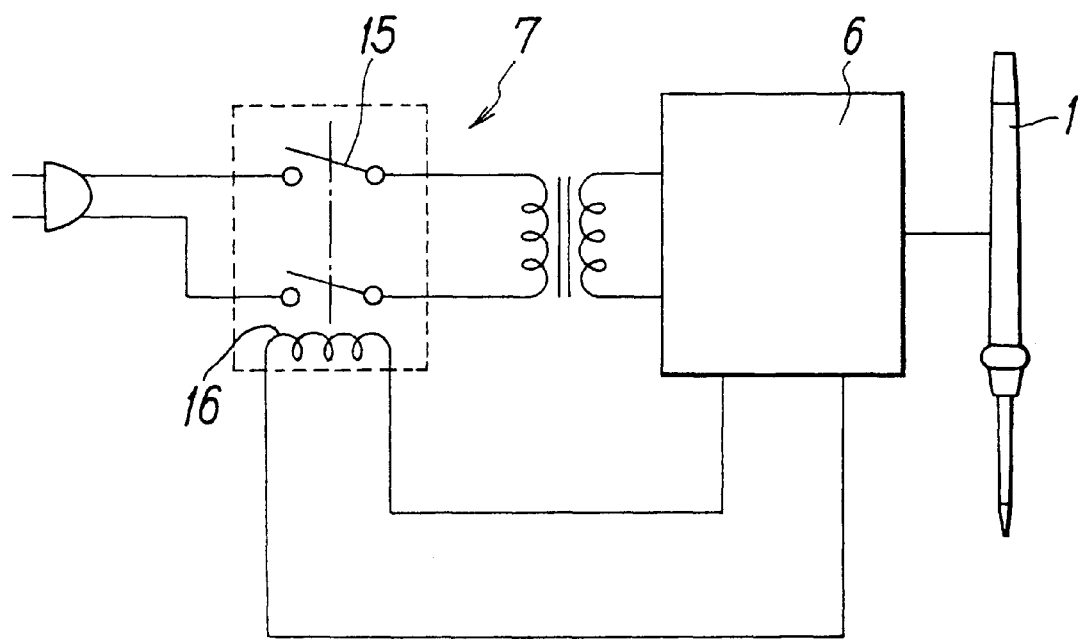
FIG. 4 is a schematic illustration of a configuration of a soldering apparatus according to a third embodiment of this invention.

Although the soldering apparatus according to this embodiment is designed such that the heater 2 is turned off when the time for which the soldering iron is not put to use exceeds the second set time, the controller 6 remains in the energized condition and the power is consumed slightly. For this reason, for eliminating the power consumption completely to further promote the economy and the safety, it is preferable to, when the heater 2 gets into the power-off mode, also turn off the power supply circuit of the controller. FIGS. 3 and 4 are illustrations of a soldering apparatus having such a feature therefor.

In a soldering apparatus according to a second embodiment shown in FIG. 3, a non-locked type power switch 8 made to take its on condition only while being pressed and a contact 9a of a self-holding relay 9 are placed in parallel with each other and connected to the primary side of a power supply circuit 7 which makes a connection between the controller 6 and a power source, with the relay 9 being connected to the controller 6 and being turned on simultaneously with the energization to the controller 6 while being turned off concurrently with the turning-off of the heater 2 or turned off by the effect of a timer after the elapse of a given period of time from the turning-off of the heater 2. The other arrangement is substantially the same as that of the above-described first embodiment.

In the soldering apparatus according to the second embodiment, when the power switch 8 undergoes depression, the relay 9 is turned on to close the contact 9a so that the power supply circuit 7 is self-held in the on condition. Thus, even if the power switch 8 is released, the controller 6 is maintained in the energized condition.

Furthermore, when the time for which the soldering iron 1 is not put to use exceeds the second set time and the heater 2 is placed into the power-off mode or when a given period of time is further elapsed thereafter, the aforesaid relay 9 is turned off to open the contact 9a so that the power supply circuit 7 is turned off to cancel the energization to the controller 6. In consequence, the power consumption comes to zero to promote the economy and to improve the safety because of eliminating the danger stemming from the energized condition left.

Once the power supply circuit 7 is put to the off condition, the energization to the controller 6 becomes impossible except by the operator pressing the power switch 8. Accordingly, even if, after being broken due to the power failure or the effect of a breaker, the power is restored or returned, it is possible to avoid that the controller 6 is energized accidentally or carelessly to turn on the heater 2, so that the safety improves.

On the other hand, in a third embodiment shown in FIG. 4, a power switch 15 with a reset feature is connected to the power supply circuit 7. This power switch 15 is of a locked type capable of retaining its on condition, with its locking being canceled by an electromagnetic force generated by a reset coil 16. Further, this reset coil 16 is connected to the controller 6 and, when the heater turns to the power-off mode, an energization is made to the reset coil 16 to release the power switch 15 from its locked condition so that the power switch 15 comes into its off condition. Naturally, this power switch 15 can be turned off.

Figure 5:
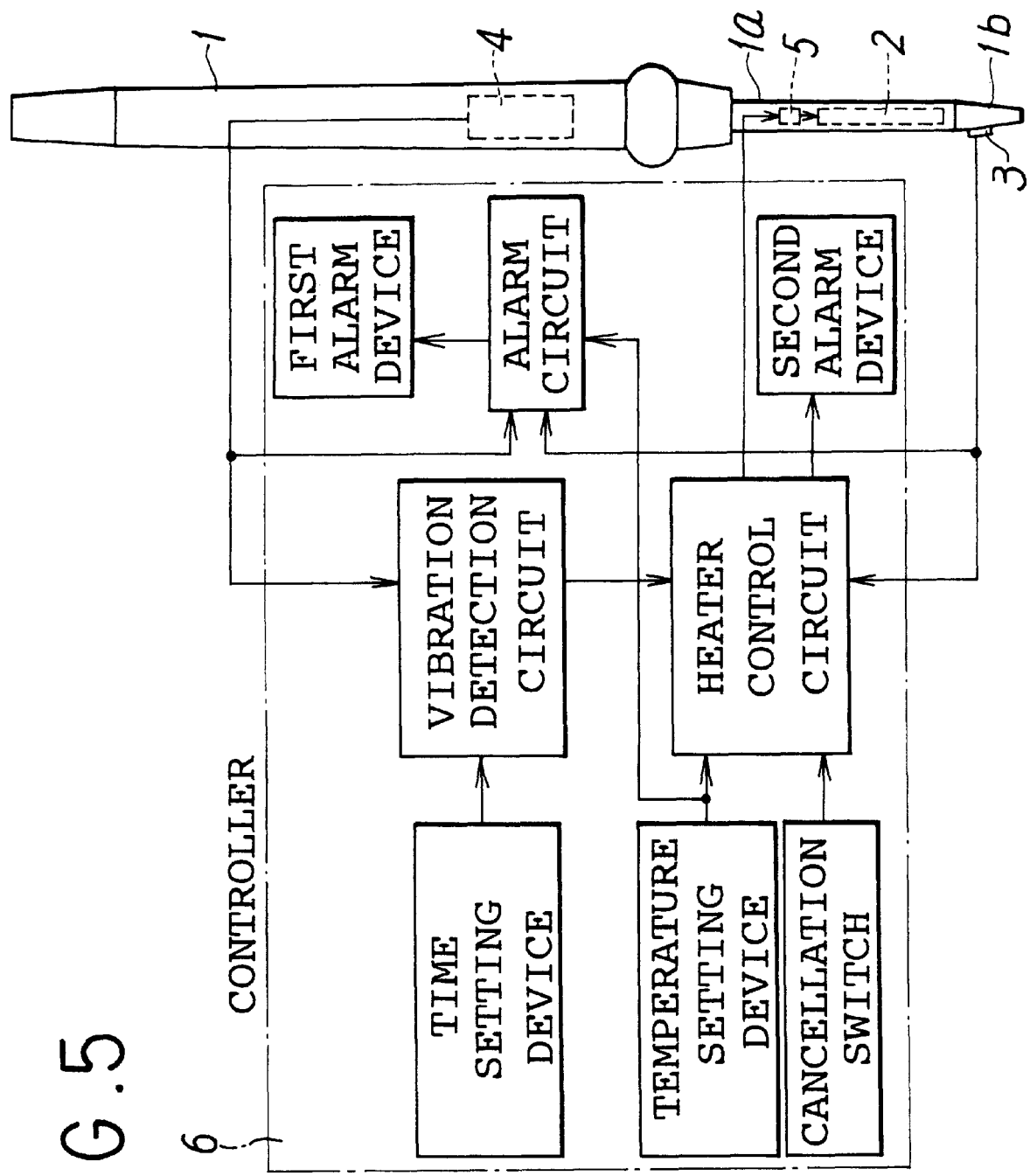
FIG. 5 is an illustration of a configuration of a soldering apparatus according to a fourth embodiment of this invention.

FIG. 5 is an illustration of a fourth embodiment of this invention. A difference of a soldering apparatus according to the fourth embodiment from that according to the above-described first embodiment is that a second alarm means is provided to prevent the soldering from being done at temperatures which do not meet the soldering requirements.

This second alarm means is equipped with a second alarm device for issuing a signal such as voice, light or vibrations, and an alarm circuit for operating the second alarm device. This alarm circuit is connected to the temperature sensor 3, to the vibration sensor 4 and further to the temperature setting device. When the vibration sensor 4 detects the vibrations of the soldering iron 1 (that is, when the soldering work starts) in a state in which the iron tip portion temperature does not assume the first set temperature, that is, when it does not meet the soldering requirement, the second alarm device is operated to issue the alarm signal toward the operator. The alarm signal from this second alarm device is required to be different in frequency, wavelength or the like from the alarm signal from the aforesaid first alarm device to be distinguishable therefrom.

The installation of this second alarm means permits giving a notice to the operator through the use of the alarm signal in a case that the iron tip portion temperature does not satisfy the work requirement due to the disconnection of the sensor, the failure of the heater or the like, or in a state that the iron tip portion temperature does not sufficiently come up yet at the work resumption from the low-temperature mode caused by the interruption of the work. Accordingly, the operator can discontinue the work immediately, thereby avoiding the deterioration of the soldering.

Also in the soldering apparatus according to the fourth embodiment, it is possible to add to the power supply circuit of the controller the switch means for releasing the power supply circuit form its operation when the heater 2 is switched to the power-off mode, as described in the second and third embodiments.

Furthermore, although in the above description of the embodiments the soldering iron 1 is of a contact type, the soldering iron 1 can also be of a non-contact type that a gas such as air and nitrogen is heated by a heater and discharged through a nozzle made in the iron tip to melt the solder by the heat of the high-temperature gas for the soldering.

As described above, according to this invention, if a soldering iron is left on for a given period of time due to the interruption of the soldering work, the safety device operates automatically to bring the heater to the low-temperature mode, whereupon the danger such as fire disaster lowers to improve the safety, and the deterioration of the iron tip portion by the oxidation is avoidable and wasteful power consumption is surely preventable.

In addition, since the vibration sensor is attached to the soldering iron to sense the vibrations of the soldering iron directly, it is possible to certainly detect the no-use state of the soldering iron irrespective of the locations of the soldering iron, which enhances the detection efficiency and provides extremely high safety.

Still additionally, since the soldering work is resumed from the low-temperature mode, in which the iron tip portion is maintained at a low temperature, if the work interruption time is short, the iron tip portion temperature rises quickly after the resumption and the resumption of the soldering work becomes possible after the elapse of a short time, which provides a high working efficiency.

What is claimed is:

1. A soldering apparatus with a safety device, comprising:
   a soldering iron equipped with an electrically heated type heater;
   a temperature sensor for sensing a temperature of a tip portion of said soldering iron;
   a vibration sensor attached to said soldering iron for sensing vibrations of said soldering iron at the use of said soldering iron; and
   a controller for controlling a temperature of said soldering iron,
      wherein said controller includes a heater control circuit for controlling said heater and a vibration detection circuit for receiving a signal from said vibration sensor to perform switching among a plurality of control modes said heater control circuit performs, and
      said heater control circuit is adapted to provide said plurality of control modes through the switching operation, with said plurality of control modes including a high-temperature mode to maintain a temperature of said tip portion of said soldering iron at a high temperature meeting a soldering requirement, a low-temperature mode to maintain said iron tip portion temperature at a low temperature lower then said high temperature meeting said soldering requirements, and a
   power-off mode to turn off said heater, and
      said vibration detection circuit causes said heater control circuit to enable said high-temperature mode while a vibration no-detection time for which said vibration sensor does not sense the vibrations of said soldering iron continuously does not exceed a first set time, and causes said heater control circuit to switch to said low-temperature mode when said vibration no-detection time exceeds said first set time, and further causes said heater control circuit to switch to said power-off mode when said vibration no-detection time exceeds a second set time, and
      wherein said heater control circuit is provided with a mode cancellation switch so that, when said heater control circuit is in said low-temperature mode and if said mode cancellation switch is pressed or if said vibration sensor senses the vibrations of said soldering iron, said low temperature mode is canceled, while, when said heater control circuit is in said power-off mode, the cancellation of said power-off mode is effected only by the pressing of said mode cancellation switch.

2. A soldering apparatus as defined in claim 1, wherein said controller includes a power supply circuit equipped with switch means whereby said power supply circuit is released from its operation when said heater is switched to said power-off mode.

3. A soldering apparatus as defined in claim 2, wherein said switch means includes a non-locked type power switch connected to said power supply circuit, a self-holding contact connected in parallel with said power switch, and a relay turned on simultaneously with an energization to said controller to close said contact and turned off to open said contact when said heater is switched to said power-off mode.

4. A soldering apparatus as defined in claim 2, wherein said switch means includes a locked type power switch connected to said power supply circuit and a reset feature for releasing said power switch from its locked condition by an electromagnetic force, with said reset feature being energized when said heater is switched to said power-off mode.

5. A soldering apparatus as defined in claim 1, wherein said heater control circuit is equipped with first alarm means which issues an alarm signal when said heater control circuit is switched to said low-temperature mode.

6. A soldering apparatus as defined in claim 1, wherein said vibration sensor includes a pair of contacts connected to said vibration detection circuit and a conductive vibrating member disposed movably between said pair of contacts to move freely by the vibrations occurring at the use of said soldering iron to open and close said pair of contacts.

7. A soldering apparatuses comprising:
   a soldering iron equipped with an electrically heated type heater;
   a temperature sensor for sensing a temperature of a tip portion of said soldering iron;
   a vibration sensor attached to said soldering iron for sensing vibrations of said soldering iron at the use of said soldering iron;
   a controller for controlling a temperature of said soldering iron; and
   first alarm means which issues a first alarm signal when said vibration sensor senses the vibrations of said soldering iron in a state that said iron tip portion temperature does not satisfy said soldering requirement,
      wherein said controller includes a heater control circuit for controlling said heater and a vibration detection circuit for receiving a signal from said vibration sensor to perform switching among a plurality of control modes said heater control circuit performs, and
      said heater control circuit is adapted to provide said plurality of control modes through the switching operation, with said plurality of control modes including a high-temperature mode to maintain a temperature of said tip portion of said soldering iron at a high temperature meeting a soldering requirement, a low-temperature mode to maintain said iron tip portion temperature at a low temperature lower than said high temperature meeting said soldering requirement, and a
   power-off mode to turn off said heater, and
      said vibration detection circuit causes said heater control circuit to enable said high-temperature mode while a vibration no-detection time for which said vibration sensor does not sense the vibrations of said soldering iron continuously does not exceed a first set time, and causes said heater control circuit to switch to said low-temperature mode when said vibration no-detection time exceeds said first set time, and further causes said heater control circuit to switch to said power-off mode when said vibration no-detection time exceeds a second set time.

8. A soldering apparatus as defined in claim 7, wherein said controller includes a power supply circuit equipped with switch means whereby said power supply circuit is released from its operation when said heater is switched to said power-off mode.

9. A soldering apparatus as defined in claim 8, wherein said switch means includes a non-locked type power switch connected to said power supply circuit, a self-holding contact connected in parallel with said power switch, and a relay turned on simultaneously with an energization to said controller to close said contact and turned off to open said contact when said heater is switched to said power-off mode.

10. A soldering apparatus as defined in claim 8, wherein said switch means includes a locked type power switch connected to said power supply circuit and a reset feature for releasing said power switch from its locked condition by an electromagnetic force, with said reset feature being energized when said heater is switched to said power-off mode.

11. A soldering apparatus as defined in claim 7, wherein said heater control circuit is equipped with second alarm means which issues a second alarm signal when said heater control circuit is switched to said low-temperature mode.

12. A soldering apparatus as defined in claim 7, wherein said vibration sensor is made up of a pair of contacts connected to said vibration detection circuit and a conductive vibrating member disposed movably between said pair of contacts to move freely by the vibrations occurring at the use of said soldering iron to open and close said pair of contacts.

13. A soldering apparatus with a safety device, comprising:
- a soldering iron equipped with an electrically heated type heater;
- a temperature sensor for sensing a temperature of a tip portion of said soldering iron;
- a vibration sensor attached to said soldering iron for sensing vibrations of said soldering iron at the use of said soldering iron;
- a controller for controlling a temperature of said soldering iron; and
- first alarm means which issues a fast alarm signal when said vibration sensor senses the vibrations of said soldering iron in a state that said iron tip portion temperature does not satisfy said soldering requirement;
  - wherein said controller includes a heater control circuit for controlling said heater and a vibration detection circuit for receiving a signal from said vibration sensor to perform switching among a plurality of control modes said heater control circuit performs, and
  - said heater control circuit is adapted to provide said plurality of control modes through the switching operation, with said plurality of control modes including a high-temperature mode to maintain a temperature of said tip portion of said soldering iron at a high temperature meeting a soldering requirement, a low-temperature mode to maintain said iron tip portion temperature at a low temperature lower than said high temperature meeting said soldering requirement, and a power-off mode to turn off said heater, and
  - said vibration detection circuit causes said heater control circuit to enable said high-temperature mode while a vibration no-detection time for which said vibration sensor does not sense the vibrations of said soldering iron continuously does not exceed a first set time, and causes said heater control circuit to switch to said low-temperature mode when said vibration no-detection time exceeds said first set time, and further causes said heater control circuit to switch to said power-off mode when said vibration no-detection time exceeds a second set time; and
  - wherein said heater control circuit is provided with a mode cancellation switch so that, when said heater control circuit is in said low-temperature mode and if said mode cancellation switch is pressed or if said vibration sensor senses the vibrations of said soldering iron, said low temperature mode is canceled, while, when said heater control circuit is in said power-off mode, the cancellation of said power-off mode is effected only by the pressing of said mode cancellation switch.

14. A soldering apparatus as defined in claim 13, wherein said controller includes a power supply circuit equipped with switch means whereby said power supply circuit is released from its operation when said heater is switched to said power-off mode.

15. A soldering apparatus as defined in claim 14, wherein said switch means includes a non-locked type power switch connected to said power supply circuit a self holding contact connected in parallel with said power switch, and a relay turned on simultaneously with an energization to said controller to close said contact and turned off to open said contact when said heater is switched to said power-off mode.

16. A soldering apparatus as defined in claim 14, wherein said switch means includes a locked type power switch connected to said power supply circuit and a reset feature for releasing said power switch from its locked condition by an electromagnetic force, with said reset feature being energized when said heater is switched to said power-off mode.

17. A soldering apparatus as defined in claim 13, wherein said heater control circuit is equipped with second alarm means which issues a second alarm signal when said heater control circuit is switched to said low-temperature mode.

18. A soldering apparatus as defined in claim 13, wherein said vibration sensor includes a pair of contacts connected to said vibration detection circuit and a conductive vibrating member disposed movably between said pair of contacts to move freely by the vibrations occurring at the use of said soldering iron to open and close said pair of contacts.

* * * * *